Oct. 30, 1951 A. J. VERHEGGEN 2,573,518
MEANS FOR THE MANUFACTURE OF PATTERNED EMBOSSED GLASS
Filed March 13, 1947 2 SHEETS—SHEET 1
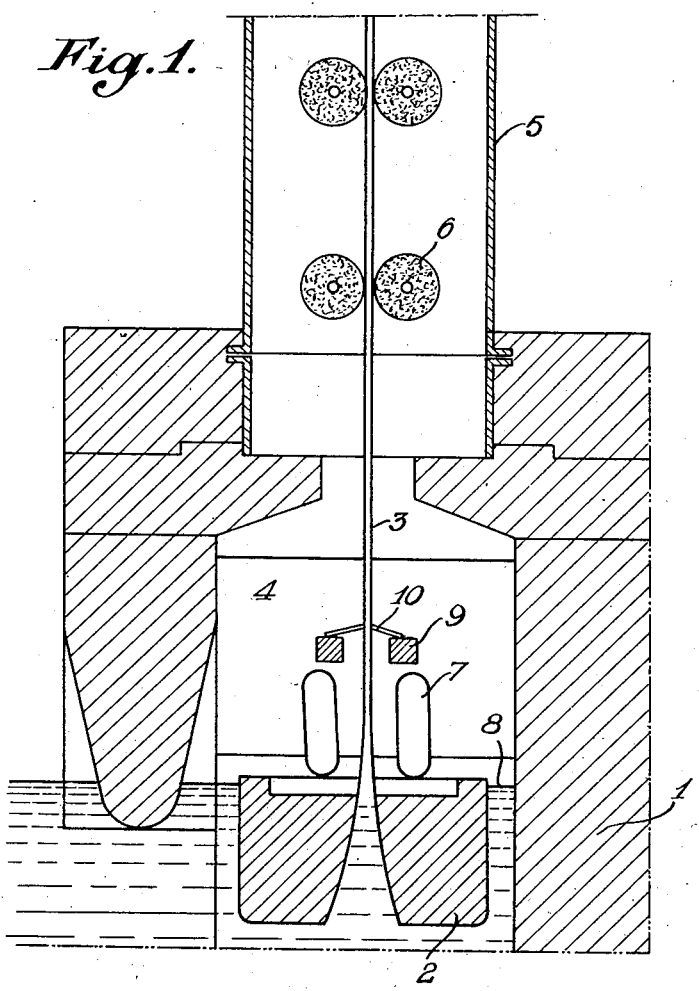
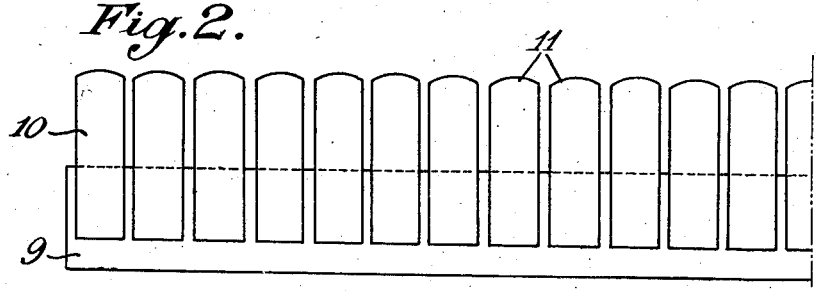
INVENTOR
Albert Joseph Verheggen
By Robert E. Burns
ATTORNEY Oct. 30, 1951            A. J. VERHEGGEN            2,573,518

MEANS FOR THE MANUFACTURE OF PATTERNED EMBOSSED GLASS

Filed March 13, 1947            2 SHEETS—SHEET 2

Patented Oct. 30, 1951

2,573,518

UNITED STATES PATENT OFFICE 2,573,518

MEANS FOR THE MANUFACTURE OF PATTERNED EMBOSSED GLASS

Albert Joseph Verheggen, Lodelinsart, Belgium, assignor to Union des Verreries Mecaniques Belges, Société Anonyme, Charleroi, Belgium, a Belgian company Application March 13, 1947, Serial No. 734,432
In Belgium May 20, 1939

Section 1, Public Law 690, August 8, 1946
Patent expires May 20, 1959

9 Claims. (Cl. 49—17)

My present invention relates to the manufacture of patterned or embossed glass in glass drawing machines.

The manufacture of fluted, striated or imprinted glass has, hitherto, been carried out by various processes, but more especially by pouring the glass on to a table and impressing it by means of a pattern roller.

With a view to reducing the production costs, attempts have already been made to manufacture such glass in Fourcault glass drawing machines, by providing the orifice of the drawing die or feeding device with an attachment having recesses and projections corresponding to the pattern to be produced.

This arrangement has several drawbacks. Thus it is evident that to change from one pattern of glass to another, it is necessary to change the drawing die or feeding device—a great inconvenience in view of the comparatively small quantities of each kind of glass that the manufacturer can market. Furthermore, the process can be used only for the production of fluted glass.

The object of my present invention is to remedy these inconveniences and the latter relates to simple means allowing to produce patterned glass in known glass drawing machines, and without having to make use of the drawing die or feeding device in producing the patterns.

With this object in view my invention consists in disposing, above the free surface of the bath of molten glass, suitable tools which act on the glass, in the zone in which it is still in a plastic condition.

In the practical embodiment of the invention, use is made of a device which is constituted by a support mounted above the free surface of the bath, on one or both sides of the updrawn sheet of glass, and housing pattern forming tools which are set to contact with the glass sheet.

The pattern forming tools, or their supports, may be caused intermittently to change their position relative to the glass sheet in such a manner as to produce different patterns on the glass.

To enable the invention to be properly understood a typical embodiment thereof will now be described by way of example and with reference to the accompanying drawings in which:

Fig. 1 is a diagrammatic section of a machine for drawing glass into sheet form, and provided with a pattern forming device in accordance with my invention.

Fig. 2 is a plan, drawn to a larger scale, of the pattern forming tools which act on the glass sheet.

Figure 3:
Fig. 3 is a section of a sheet of fluted glass produced according to the invention by the device shown in Figs. 1 and 2.

Referring to the drawings 1 denotes the walls of a Fourcault drawing pot or bath, and 2 the feeding device, which effects the formation of a sheet of glass 3 the sheet being drawn upwards through the drawing chamber 4, and thence into the tower 5 of the machine between drawing rollers 6.

Located inside the drawing chamber 4 are cooling water pipes 7, which congeal the molten glass sheet issuing from the feeding device 2 and bath 1.

According to the invention, supports 9 which are located above the surface 8 of the glass in the drawing chamber 4 accommodate pattern forming tools in the form of a series of combs 10, the tips 11 of which are set in contact with the glass sheet 3, in the zone wherein the glass is still plastic. The tips 11 of the combs 10 may be of any desired contour, for example rounded (Fig. 2). The combs may be disposed at one or both sides of the glass sheet and when the combs are stationary in relation to the glass, the latter is fluted in the manner represented, in section, in Fig. 3, which shows undulations, or hollows 12.

Figure 4:
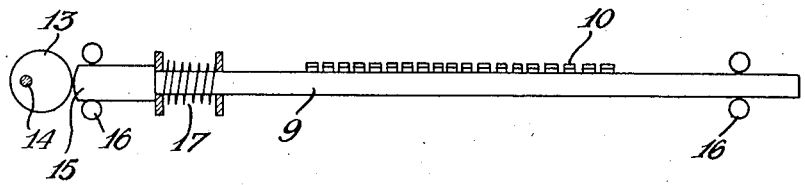
Fig. 4 is a diagrammatic view of an example of a cam-operated pattern tool carrier, for the purpose of imparting a reciprocating horizontal movement to the latter.
Figure 5:
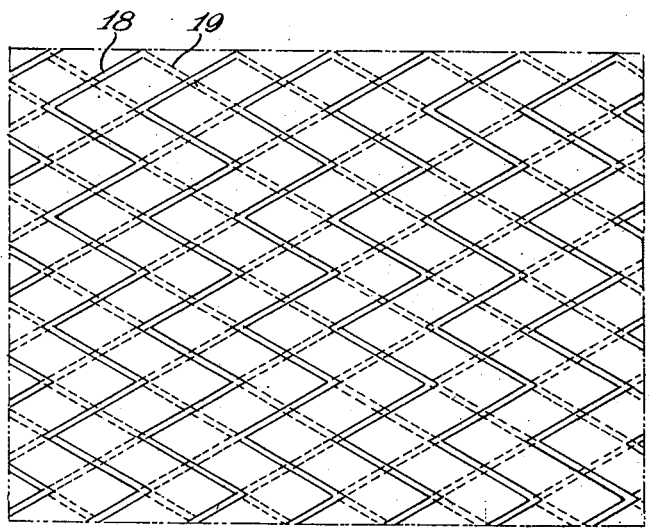
Fig. 5 shows the pattern produced upon a sheet of glass by the device according to Fig. 4.

Simple or compound movements may also be imparted to the said combs, for example a reciprocating horizontal movement. As shown in Fig. 4, this movement may be obtained by means of an eccentric 13 which turns on an axis 14 and acts on the end 15 of the support 9, the latter being guided by rollers 16 and under the influence of a compression spring 17 which presses the support against the eccentric 13. In this way, the combs 10 are moved in relation to the glass sheet, and, in consequence of the upward movement of the latter, form patterns 18 in the surface of the glass contacted by the combs. Similar, or different, patterns 19, and also stippled patterns, may also be produced on the other side of the glass.

In this manner, by selecting the movements imparted to the combs, and the profiling of the latter, a great variety of patterns can be produced on the drawn sheets.

The tools or combs can be easily inserted and removed while the machine is in operation. Consequently it is possible to change over from the production of plain glass to the production of special patterned glass, or from the production of one kind of patterned glass to another of different pattern with the greatest facility and without loss of output.

What I claim is:

1. In a glass drawing machine, means for the manufacture of substantially transparent patterned or embossed glass, said means comprising tools disposed on at least one side of a drawing sheet whereby the pattern is impressed upon the surface of the glass during the drawing operation in a zone in which the glass is in a plastic state, supporting means for the tools, said supporting means being arranged above the free surface of the glass and movably mounted for reciprocation in a direction crosswise of the sheet and parallel to the plane of the sheet, and means for reciprocating said supporting means.

2. In a glass drawing machine, means for the manufacture of substantially transparent patterned or embossed glass, said means comprising tools disposed on at least one side of a drawing sheet whereby the pattern is impressed upon the surface of the glass during the drawing operation in a zone in which the glass is in a plastic state, supporting means for the tools, said supporting means being arranged above the free surface of the glass and movably mounted for reciprocation in a direction crosswise of the sheet and parallel to the plane of the sheet, the said tools being shaped in a form suitable for producing the desired pattern, and means for reciprocating said supporting means.

3. In a glass drawing machine, means for the manufacture of substantially transparent patterned or embossed glass, said means comprising tools disposed on at least one side of a drawing sheet whereby the pattern is impressed upon the surface of the glass during the drawing operation in a zone in which the glass is in a plastic state, supporting means for the tools, said supporting means being arranged above the free surface of the glass and parallel to the plane of the sheet, the tools being formed by a comb having tips shaped in a form suitable for producing the desired pattern and being continuously in contact with the sheet, and means for reciprocating said supporting means in a direction crosswise of the sheet and parallel to the plane of the sheet.

4. In a glass drawing machine, means for manufacture of substantially transparent patterned or embossed glass, said means comprising tools disposed on at least one side of a drawing sheet whereby the pattern is impressed upon the surface of the glass during the drawing operation in a zone in which the glass is in a plastic state, supporting means for the tools, said supporting means being arranged above the free surface of the glass and parallel to the plane of the sheet, the tools being formed by a comb having tips shaped in a form suitable for producing the desired pattern and being continuously in contact with the sheet, and means for moving said tools in a direction crosswise of the sheet and parallel to the plane of the sheet, the variety of patterns being produced on the drawn sheets by selecting the movements imparted to the combs and the profiling of the latter.

5. In a continuous sheet glass drawing machine in combination with a receptacle for molten glass and means for drawing a sheet of glass vertically and upwardly therefrom, means positioned above the free surface of the glass in the receptacle and on at least one side of the vertically moving glass for applying a surface pattern thereto, said means comprising a support disposed parallel to the plane of the glass sheet and pattern forming tools carried by said support and arranged to engage the drawn glass sheet, said supports being positioned vertically with respect to the molten glass receptacle at a point at which the glass is in a plastic state, and means to impart a reciprocating horizontal movement to said support in a direction parallel to the plane of the sheet, the patterns on the glass being formed by the movement of the tools in relation to the glass sheet by reason of the upward movement of the sheet.

6. In a continuous sheet glass drawing machine in combination with a receptacle for molten glass and means for drawing a sheet of glass vertically and upwardly therefrom, means positioned above the free surface of the glass in the receptacle and on at least one side of the vertically moving glass for applying a surface pattern thereto, said means comprising a support disposed parallel to the plane of the glass sheet and pattern forming tools carried by said support and arranged to engage the drawn glass sheet, said support being positioned vertically with respect to the molten glass receptacle at a point at which the glass is in a plastic state, and means to impart a reciprocating horizontal movement to said support in a direction parallel to the plane of the sheet, the patterns on the glass being formed by the movement of the tools in relation to the glass sheet by reason of the upward movement of the sheet, the said reciprocating means being adapted to impart selected movements to said support whereby to permit the production of a variety of patterns on the glass.

7. In a continuous sheet glass drawing machine in combination with a receptacle for molten glass and means for drawing a sheet of glass vertically and upwardly therefrom, means positioned above the free surface of the glass in the receptacle and on at least one side of the vertically moving glass for applying a surface pattern thereto, said means comprising a support disposed parallel to the plane of the glass sheet and pattern forming tools carried by said support and arranged to engage the drawn glass sheet, said support being positioned vertically with respect to the molten glass receptacle at a point at which the glass is in a plastic state, and means for imparting a reciprocating horizontal movement to the tools in a direction parallel to the plane of the sheet, said reciprocating horizontal movement being effected by means acting on the ends of said support.

8. In a continuous sheet glass drawing machine in combination with a receptacle for molten glass and means for drawing a sheet of glass vertically and upwardly therefrom, means positioned above the free surface of the glass in the receptacle and on at least one side of the vertically moving glass for applying a surface pattern thereto, said means comprising a support disposed parallel to the plane of the glass sheet and pattern forming tools carried by said support and arranged to engage the drawn glass sheet, said support being positioned vertically with respect to the molten glass receptacle at a point at which the glass is in a plastic state, said tools comprising comb teeth, and means for acting on one end of the said support for the tools for imparting a horizontal reciprocating movement to the tools in a direction parallel to the plane of the sheet, said reciprocating means being adapted to impart selected movements to said tools whereby to permit the production of a variety of patterns on said glass sheet.

9. In a continuous sheet glass drawing machine in combination with a receptacle for molten glass, means for forming a sheet of glass and means for drawing the sheet of glass vertically upward therefrom, means positioned above said sheet forming means for applying a surface pattern to at least one side of the glass sheet, said means comprising a support disposed parallel to the plane of the glass sheet and a multiplicity of blunt ended pattern-forming tools carried by said support and arranged to engage the drawn glass sheet at a point above and spaced from said sheet forming means where the glass is still in a plastic state, the width of the blunt sheet-engaging portions of the individual tools in a direction crosswise of the glass sheet being substantially greater than the spaces between successive tools, whereby a pattern comprising spaced parallel projecting ridges is formed on the face of the glass sheet.

ALBERT JOSEPH VERHEGGEN.

REFERENCES CITED

The following references are of record in the file of this patent:

UNITED STATES PATENTS

| Number | Name | Date |
|---|---|---|
| 901,800 | Fourcault | Oct. 20, 1908 |
| 1,162,114 | Swarovski | Nov. 30, 1915 |
| 1,391,405 | Rhonemus | Sept. 20, 1921 |
| 2,108,811 | Fisher | Feb. 22, 1938 |
| 2,122,083 | Boudin et al. | June 28, 1938 |

FOREIGN PATENTS

| Number | Country | Date |
|---|---|---|
| 113,728 | Australia | Feb. 13, 1939 |
| 371,178 | Italy | May 13, 1939 |